(12) United States Patent
Hurt

(10) Patent No.: US 6,219,956 B1
(45) Date of Patent: Apr. 24, 2001

(54) FISHING LURE FRAME

(76) Inventor: Michael D. Hurt, P.O. Box 1062, Kellyville, OK (US) 74039

( * ) Notice: Subject to any disclaimer, the term of this patent is extended or adjusted under 35 U.S.C. 154(b) by 0 days.

(21) Appl. No.: 09/400,521

(22) Filed: Sep. 20, 1999

(51) Int. Cl.[7] .................................................. A01K 83/06
(52) U.S. Cl. ........................ 43/44.4; 43/44.2; 43/42.09; 43/44.6
(58) Field of Search ................... 43/44.2, 44.4, 43/44.6, 44.8, 42.09, 42.1

(56) References Cited

U.S. PATENT DOCUMENTS

| | | | |
|---|---|---|---|
| D. 187,187 | * 2/1960 | Mott | 43/44.2 |
| D. 255,375 | 6/1980 | Caleca | D22/5 |
| 590,401 | * 9/1897 | Morgan | 43/44.2 |
| 765,482 | * 7/1904 | Hardy | 43/42.09 |
| 2,522,073 | * 9/1950 | Trada | 43/44.4 |
| 2,562,605 | * 7/1951 | Embree et al. | 43/44.4 |
| 2,588,300 | * 3/1952 | Smith | 43/42.09 |
| 2,775,058 | * 12/1956 | Roberts | 43/44.4 |
| 3,105,319 | 10/1963 | Whalen | 43/44.4 |
| 3,137,960 | * 6/1964 | Sharp | 43/42.09 |
| 3,415,004 | 12/1968 | Whalen | 43/42.74 |
| 3,600,838 | * 8/1971 | Bablick | 43/44.8 |
| 3,893,255 | 7/1975 | Hicks | 43/41 |
| 4,471,558 | 9/1984 | Garcia | 43/44.4 |
| 5,377,422 | 1/1995 | Gariglio | 43/44.4 |

\* cited by examiner

*Primary Examiner*—Kurt Rowan
(74) *Attorney, Agent, or Firm*—Frank J. Catalano

(57) ABSTRACT

A frame for converting any object into a fishing lure is formed from a length of wire bent at its center into two strands approximating a wishbone symmetrical about a longitudinal axis. The strands extend through a diverging segment, a converging clamping segment and a connecting segment looped for pivotal engagement on the converging segment. The converging segment is resiliently laterally expandable and the clamping segment is resiliently rotatively expandable with the pivotally engaged connecting segment to receive and hold the object to be converted into a fishing lure therebetween. A tension ring girdingly slidable on the converging segment limits resilient lateral expansion of the frame. Preferably, the wishbone has an eye for connection to the fishing line and a shank. A fish hook may be rigged on the tension ring. A bait hook fixed to the wishbone shank can be used to secure the object in place on the frame. A second shank fixed to the wishbone shank has a second eye for connection of a second fish hook.

11 Claims, 1 Drawing Sheet

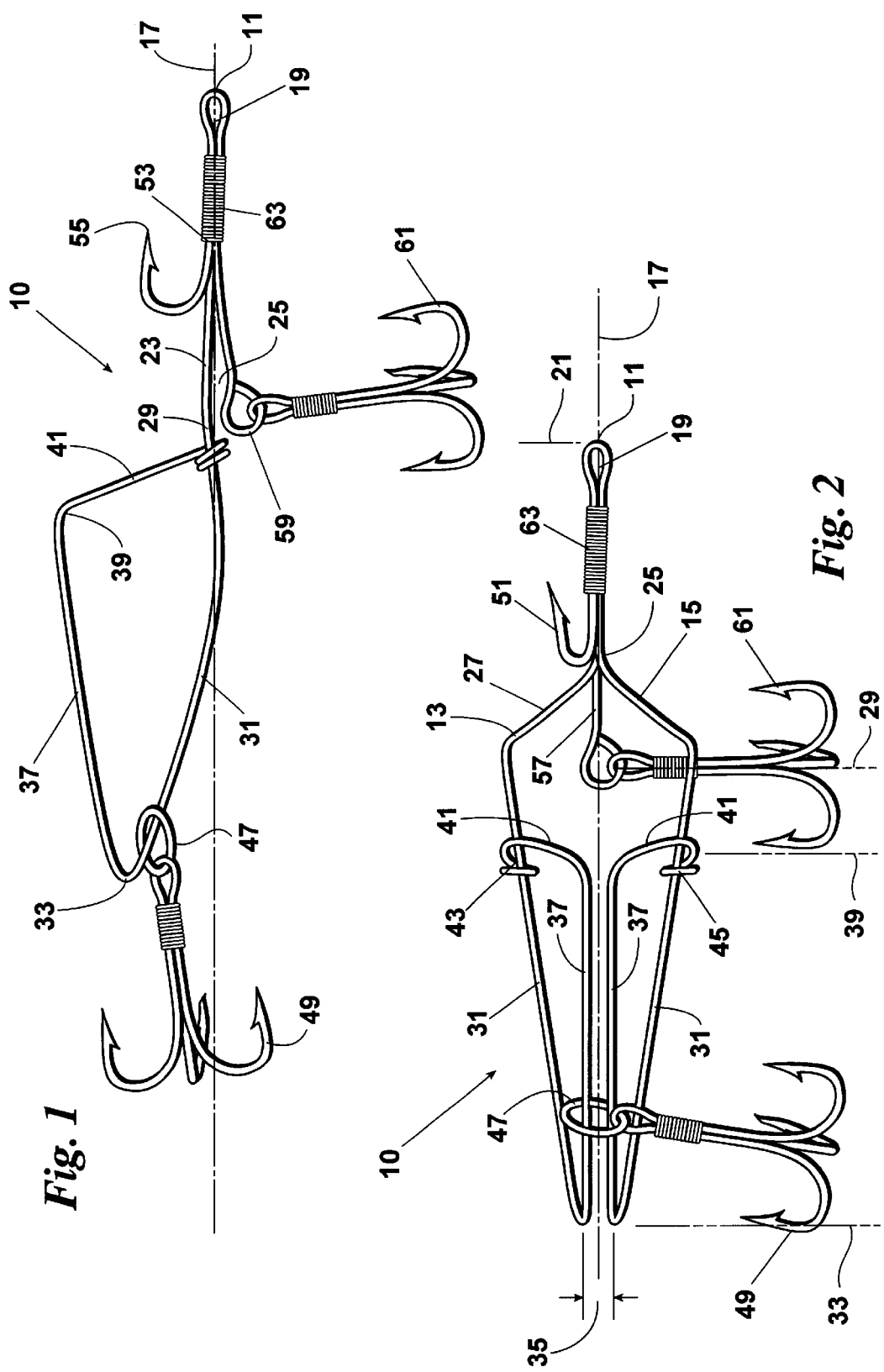

FISHING LURE FRAME

BACKGROUND OF THE INVENTION:

This invention relates generally to fishing equipment and more particularly concerns baits used for fishing.

A great variety of baits are available to the modern angler, including a selection of indigenous live baits and many types of artificial lures, including feathers, jigs and wood, metal and plastic lures, all of which can be modified to the angler's personal preferences by changing the skirts, weights and hooks associated with them. However, the seemingly limitless choices for the angler also present some problems. One problem is that, with so many options, it is neither physically practical nor economically sensible to collect all of the baits. Another problem is that while some of the baits can be modified by the addition of enhancing devices such as feathers, skirts, weights and the like, a change of baits most often means a change of the entire rig connected to the line. A further problem is that, while an angler's available choices may be extensive, on any given day, fish may be attracted to a shape or movement not provided by any of the baits on hand. In addition, baits are generally suitable for either top or bottom fishing, but not both. Also, live bait and simulated live bait rigs generally involve setting the hook in the bait in a manner that mars the natural appearance of the bait, damages its structure and/or makes baiting the hook an unpleasant task for many, and particularly younger, anglers.

It is, therefore, an object of this invention to provide a fishing lure frame which enables the angler to convert anything, whether live or artificial into a fishing lure. Another object of this invention is to provide a fishing lure frame which permits the angler to change baits without detaching the rig from the line. A further object of this invention is to provide a fishing lure frame for use in top or bottom fishing. Yet another object of this invention is to provide a fishing lure frame which helps to maintain the natural appearance of live and simulated live baits. It is also an object of this invention to provide a fishing lure frame which does not require threading of the bait onto a hook. Still another object of this invention is to provide a fishing lure frame with which the angler may use skirts, weights, feathers or any other useful attachments.

SUMMARY OF THE INVENTION

In accordance with the invention, a frame is provided for converting any object into a fishing lure. A length of wire is bent at its center into two strands approximating a wishbone symmetrical about a longitudinal axis. The strands extend in a diverging segment from the center of the wire to a first of three parallel axes transverse to the longitudinal axis, in a converging segment from the first transverse axis to the second transverse axis at which the strands are still spaced apart, in a clamping segment with the strands in parallel from the second transverse axis to the third transverse axis and between and above the first and second transverse axes and in a connecting segment from the third transverse axis to and looped for pivotal engagement on the converging segment. The converging segment is resiliently laterally expandable at the second transverse axis and the clamping segment is resiliently rotatively expandable with the pivotally engaged connecting segment to receive and hold the object to be converted into a fishing lure therebetween.

Preferably, the wishbone has an eye formed by the strands at the wire center for connection to the fishing line and a shank formed by the strands extending along a longitudinal axis from the wire center to the point of divergence of the strands. A tension ring girdingly slidable on the converging segment of the strands limits resilient lateral expansion of the frame. A fish hook may be rigged on the tension ring. A bait hook with a shank fixed to the wishbone shank and a tip pointing toward the eye and above the first transverse axis can be used to secure the object in place on the frame. A second shank fixed to the wishbone shank has a second eye at approximately the first transverse axis and a second fish hook may be rigged on the second eye. The second shank and the bait hook can be fastened to the frame by a length of wire wound about and welded to the shanks.

BRIEF DESCRIPTION OF THE DRAWINGS

Other objects and advantages of the invention will become apparent upon reading the following detailed description and upon reference to the drawings in which:

FIG. 1 is a side elevation view of the preferred embodiment of the fishing lure frame; and FIG. 2 is a top plan view of the fishing lure frame of FIG. 1.

While the invention will be described in connection with a preferred embodiment, it will be understood that it is not intended to limit the invention to that embodiment. On the contrary, it is intended to cover all alternatives, modifications and equivalents as may be included within the spirit and scope of the invention as defined by the appended claims.

DETAILED DESCRIPTION

Turning to the figures, a preferred embodiment of a frame for converting any object into a fishing lure is illustrated. A length of wire is bent at its center 11 into two strands 13 and 15 approximating a wishbone 10 symmetrical about a longitudinal axis 17. An eye 19 for connecting the frame to the fishing line (not shown) is formed by the strands 13 and 15 at the wire center 11. A shank 23 formed by the strands 13 and 15 extends along the longitudinal axis 17 from the center 11 to a point of divergence 25 of the strands 13 and 15. A diverging segment 27 extends from the point of divergence 25 to a first axis 29 transverse to the longitudinal axis 17. A converging segment 31 extends from the first transverse axis 29 to a second transverse axis 33 at which the strands 13 and 15 are spaced apart by a small distance 35. A clamping segment 37 extends with the strands 13 and 15 in parallel from the second transverse axis 33 to a third transverse axis 39 and between and above the first and second transverse axes 29 and 33. A connecting segment 41 extends from the third transverse axis 39 to loops 43 and 45 which are pivotally engaged on the converging segment 31. The converging segment 31 is resiliently laterally expandable at the second transverse axis 33 and the clamping segment 37 is resiliently rotatively expandable with the pivotally engaged connecting segment 41 to receive and hold the object (not shown) therebetween.

A tension ring 47 girdingly slidable on the converging segment 31 of the strands 13 and 15 limits the resilient lateral expansion of the converging segment. A fish hook, such as the treble hook 49 shown, is rigged on the tension ring 47. Preferably, a bait hook 51 with a shank 53 fixed to the wishbone shank 23 has its tip 55 pointing toward the eye 11 of the frame above the first transverse axis 29. The bait hook is used to position the object being converted into a bait on the frame. It is also preferred that another shank 57 be fixed to the wishbone shank 23 with a second eye 59 at approximately the first transverse axis 29 with a fish hook, such as the treble hook 61 shown, rigged on it. A length of wire 63 wound about and welded to the shanks 23, 53 and 63 secures these components into an integral frame. The first hook 51 can be considerably smaller than the fishing hooks 49 and 61, minimizing damage to the object. In one alternate arrangement of the frame, the shanks 23, 53 and 63 can be eliminated altogether. Fewer or additional eyes can also be used to vary the number of fish hooks on the frame.

The frame is tapered horizontally and vertically to allow the fish to mouth it easily. Various frames having different taper and of different sizes can be employed, depending on the type of fish sought by the angler.

The frame prototype was made of piano wire that was heated with a torch and cooled in water after the frame was formed to anneal or temper the frame and provide the desired strength and resilience. However, any material can be used so long as the finished frame exhibits the desired strength and resilience. The frame could be molded rather than bent.

To use the frame, the angler selects the appropriate size and type of frame to be used and rigs it to the line in any conventional manner. The converging 31 and clamping 37 segments are expanded to open the frame and the object is inserted into the frame. A front portion of the object is impaled on the tip 55 of the small bait hook 53, if the hook 53 is used, and the object is extended smoothly in the frame. The converging 31 and clamping 37 segments are released to firmly but gently hold the object in place. To change baits, the angler merely removes the object in use from the frame and mounts a new object. The prototype has been successful using carrots, celery and various plastic and rubber baits. However, the possibilities extend as far as the angler's imagination.

Thus, it is apparent that there has been provided, in accordance with the invention, a fishing lure frame that fully satisfies the objects, aims and advantages set forth above. While the invention has been described in conjunction with a specific embodiment thereof, it is evident that many alternatives, modifications and variations will be apparent to those skilled in the art and in light of the foregoing description. Accordingly, it is intended to embrace all such alternatives, modifications and variations as fall within the spirit of the appended claims.

What is claimed is:

1. A frame for converting any object into a fishing lure comprising a length of wire bent at a center thereof into two strands to approximate a wishbone symmetrical about a longitudinal axis, said wishbone having a diverging segment with said strands extending from said center to a first of three parallel axes transverse to said longitudinal axis, a converging segment with said strands extending from said first transverse axis to a second of said transverse axes at which said strands are spaced apart, a clamping segment with said strands extending in parallel upwardly from said second transverse axis to a third of said transverse axes and a connecting segment with said strands extending from said third transverse axis to and looped for pivotal engagement on said converging segment, said converging segment being resiliently laterally expandable at said second transverse axis and said clamping segment being resiliently rotatively expandable with said pivotally engaged connecting segment to receive and hold the object therebetween.

2. A frame according to claim 1, said wishbone further having an eye formed by said strands at said wire center.

3. A frame according to claim 1, said wishbone further having a shank with said strands extending along a longitudinal axis from said center to said point of divergence of said strands.

4. A frame for converting any object into a fishing lure comprising a length of wire bent at a center thereof into two strands to approximate a wishbone, said wishbone having an eye formed by said strands at said wire center, a shank with said strands extending along a longitudinal axis from said eye to a point of divergence of said strands, a diverging segment with said strands extending from said point of divergence to a first of three parallel axes transverse to said longitudinal axis, a converging segment with said strands extending from said first transverse axis to a second of said transverse axes at which said strands are spaced apart, a clamping segment with said strands extending in parallel upwardly from said second transverse axis to a third of said transverse axes and a connecting segment with said strands extending from said third transverse axis to and looped for pivotal engagement on said converging segment, said converging segment being resiliently laterally expandable at said second transverse axis and said clamping segment being resiliently rotatively expandable with said pivotally engaged connecting segment to receive and hold the object therebetween.

5. A frame according to claim 4 further comprising a tension ring girdingly slidable on said converging segment of said strands and limiting resilient lateral expansion thereof.

6. A frame according to claim 5 further comprising a fish hook rigged on said tension ring.

7. A frame according to claim 4 further comprising a bait hook having a shank fixed to said wishbone shank and a tip pointing toward said eye and above said first transverse axis.

8. A frame according to claim 4 further comprising a shank fixed to said wishbone shank having a second eye at approximately said first transverse axis and a fish hook rigged on said second eye.

9. A frame for converting any object into a fishing lure comprising a length of wire bent at a center thereof into two strands to approximate a wishbone, said wishbone having an eye formed by said strands at said wire center, a shank with said strands extending along a longitudinal axis from said eye to a point of divergence of said strands, a diverging segment with said strands extending from said point of divergence to a first of three parallel axes transverse to said longitudinal axis, a converging segment with said strands extending from said first transverse axis to a second of said transverse axes at which said strands are spaced apart, a clamping segment with said strands extending in parallel upwardly from said second transverse axis to a third of said transverse axes, a connecting segment with said strands extending from said third transverse axis to and looped for pivotal engagement on said converging segment, a tension ring girdingly slidable on said converging segment of said strands, a first fish hook rigged on said tension ring, a second shank fixed to said wishbone shank having a second eye at approximately said first transverse axis and a second fish hook rigged on said second eye, a bait hook having a third shank fixed to said wishbone shank and a tip pointing toward said eye and above said first transverse axis and means for fastening said wishbone shank, said second shank and said third shank together, said converging segment being resiliently laterally expandable at said second transverse axis to a width limited by said tension ring and said clamping segment being resiliently rotatively expandable with said pivotally engaged connecting segment to receive and hold an object engaged on said bait hook therebetween.

10. A frame according to claim 9, said fastening means comprising a length of wire wound about said shanks and welded thereto.

11. A frame for converting any object into a fishing lure comprising a length of wire bent at a center thereof into two strands to approximate a wishbone symmetrical about a longitudinal axis, said wishbone having a converging segment extending rearwardly to a clamping segment, said clamping segment extending forwardly and upwardly from a rear end of said converging segment to a connecting segment and said connecting segment extending to and looped for pivotal engagement on a forward portion of said converging segment, said converging segment being resiliently laterally expandable and said clamping segment being resiliently rotatively expandable with said pivotally engaged connecting segment to receive and hold the object therebetween.

* * * * *